A. MALLET.
KINEMATOGRAPHIC APPARATUS.
APPLICATION FILED MAY 28, 1908.
983,073.
Patented Jan. 31, 1911.
2 SHEETS—SHEET 1.
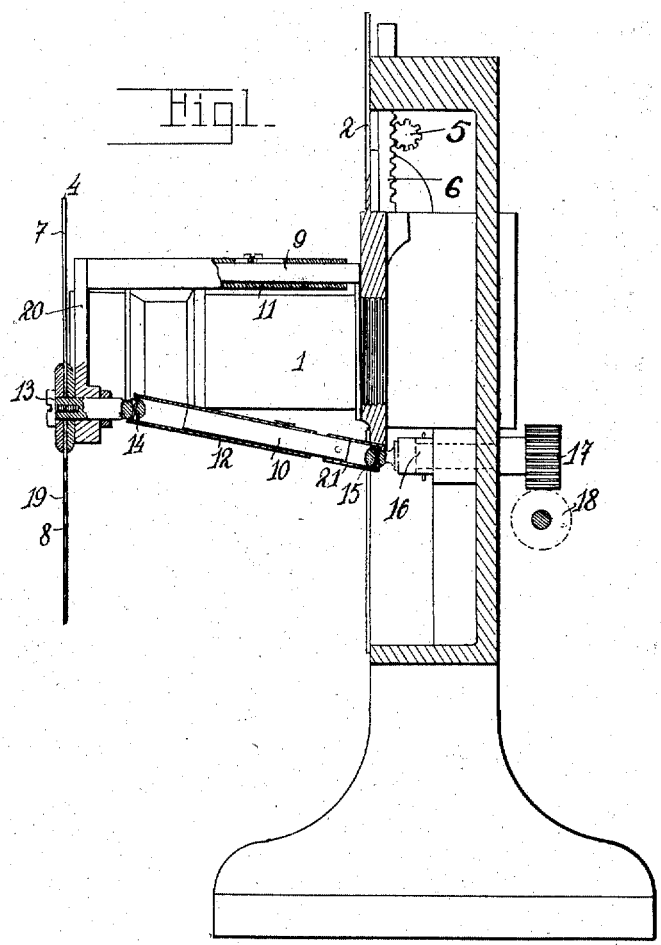

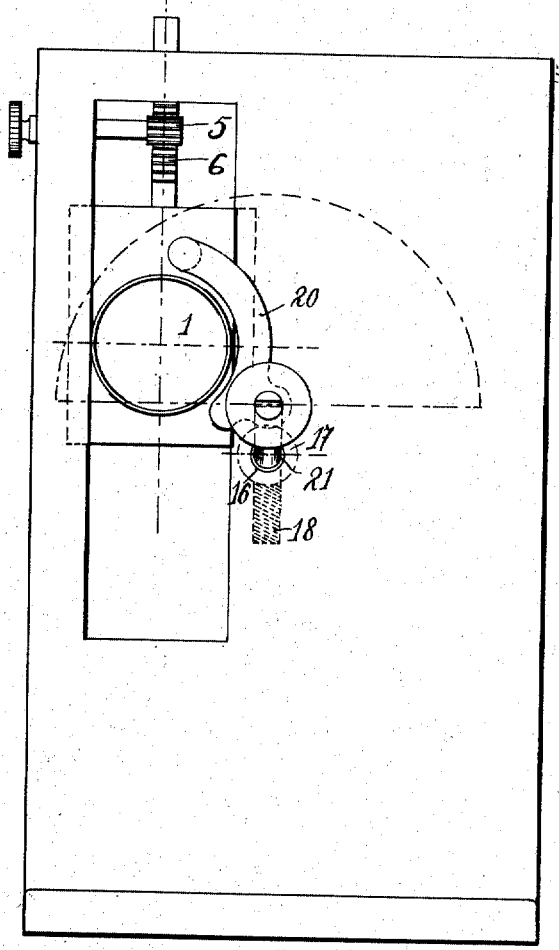

UNITED STATES PATENT OFFICE.

ARCADE MALLET, OF PARIS, FRANCE.

KINEMATOGRAPHIC APPARATUS.

983,073.  Specification of Letters Patent.  Patented Jan. 31, 1911.

Application filed May 28, 1908. Serial No. 435,516.

*To all whom it may concern:*

Be it known that I, ARCADE MALLET, a citizen of the Republic of France, and a resident of 15bis Rue Canchois, Paris, France, have invented a new and useful Improvement in Kinematographic Apparatus, of which the following is a specification.

The present invention relates to improvements in kinematographic apparatus and has for its object to prevent as far as possible the scintillations on the projections without diminishing the facility with which the projection may be centered on the screen.

Another object is to increase the amount of light in the projected picture.

My invention will be readily understood by referring to the accompanying drawings, wherein—

Figure 1 is a side view partly in elevation and partly in section. Fig. 2 is a view in front elevation.

It is well known that in an apparatus of this kind, the objective 1 of the projector must be displaced vertically and horizontally for which purpose, said projector is mounted on a sliding part 2 suitably actuated by means of the pinion 5 meshing with the rack 6, which is secured to the sliding part 2.

In carrying out the objects of this invention, a disk 4 adapted to rotate at a speed corresponding to that at which the film unrolls is interposed between the film and the screen upon which the image is to be projected.

As is well known, the film is moved with an intermittent or irregular movement, that is to say very rapid for passing from one view to another, with a slight pause as each view passes in front of the objective.

According to the present invention, the image is centered on the screen without changing the position of disk 4 in respect to the screen.

Referring more particularly to the drawing, a guide 9 is rigidly secured to the plate 2 which bears the objective 1 while at the outer end of said guide 9, depends a bracket 20 in which a pintle 13 is rotatably mounted. Fastened to said pintle 13 is the disk 4 which is thus rotatably mounted between the objective and the screen while it is at the same time subject to the horizontal and vertical adjustments of the objective. To operatively connect the disk 4 with the governing shaft 16, an extensible flexible coupling such as that which is now to be described, is made use of.

The pintle 13 is attached by a Cardan joint 14 to a member 12 sliding upon another member 10 whose extremity is keyed to a part 21 which by means of another Cardan joint 15 is connected to the governing shaft 16 which is in turn driven by the gears 17 and 18.

It will thus be seen that the objective 1 can be displaced in the manner required for centering the projection while at the same time a constant relation between the objective 1 and the rotary shutter or disk 4 is maintained.

While the apparatus hereinbefore described, has been adapted to existing machines, it is evident that many minor modifications could be made in the apparatus without departing from the spirit of my invention.

I claim—

1. In a kinematographic apparatus the combination with a vertically slidable support, of an objective mounted in said support, a shutter mechanism supported by said support and movable horizontally in relation to the objective.

2. In a kinematographic apparatus, the combination with an objective mounted on a slidable support, of a bracket secured to the said support, comprising a pair of arms having telescopic connection, one of said arms carrying a rotating shutter, means for rotating said shutter, telescopic connection between said rotating means and shutter whereby the shutter may be adjusted horizontally in relation to the objective and to the rotating means.

3. In a kinematographic apparatus, the combination with a support, of an objective slidably mounted in said support, a shutter mechanism carried by said support and movable horizontally in relation thereto.

4. In a kinematographic apparatus, an objective vertically adjustable in relation to the source of light, a rotatable shutter, telescopic means connecting the objective and shutter, whereby the shutter may be adjusted relatively to the objective.

5. In a kinematographic apparatus, the combination with an objective, of a rotating shutter and telescopic connection between the objective and shutter, whereby the distance between the same may be varied.

6. In a kinematographic apparatus, the combination with an objective, of a support carrying said objective, comprising a pair of arms having telescopic connection, one of said arms carrying a rotating shutter, means for rotating said shutter, telescopic connection between said means and shutter, whereby the shutter may be adjusted horizontally in relation to the objective and to the rotating means.

The foregoing specification signed at Paris, France, this 16th day of May, 1908.

ARCADE MALLET.

In presence of two witnesses:
ED. WOLF,
HANSON C. COXE.